(12) United States Patent
Tong et al.

(10) Patent No.: US 7,415,575 B1
(45) Date of Patent: Aug. 19, 2008

(54) SHARED CACHE WITH CLIENT-SPECIFIC REPLACEMENT POLICY

(75) Inventors: Peter C. Tong, Cupertino, CA (US); Colyn S. Case, Hyde Park, VT (US)

(73) Assignee: NVIDIA, Corporation, Santa Clara, CA (US)

( * ) Notice: Subject to any disclaimer, the term of this patent is extended or adjusted under 35 U.S.C. 154(b) by 237 days.

(21) Appl. No.: 11/298,256

(22) Filed: Dec. 8, 2005

(51) Int. Cl.
*G06F 12/12* (2006.01)

(52) U.S. Cl. .................. 711/133; 711/159; 711/129

(58) Field of Classification Search .............. None
See application file for complete search history.

(56) References Cited

U.S. PATENT DOCUMENTS

| | | | |
|---|---|---|---|
| 6,591,347 B2 * | 7/2003 | Tischler et al. .............. 711/134 |
| 6,772,199 B1 * | 8/2004 | Keller et al. .............. 709/213 |
| 2004/0059875 A1 * | 3/2004 | Garg et al. .............. 711/141 |
| 2006/0004963 A1 * | 1/2006 | Mattina et al. .............. 711/130 |
| 2006/0041720 A1 * | 2/2006 | Hu et al. .............. 711/136 |
| 2006/0143396 A1 * | 6/2006 | Cabot .............. 711/134 |

* cited by examiner

*Primary Examiner*—Denise Tran
(74) *Attorney, Agent, or Firm*—Townsend and Townsend and Crew, LLP

(57) ABSTRACT

A cache shared by multiple clients implements a client specific policy for replacing entries in the event of a cache miss. A request from any client can hit any entry in the cache. For purposes of replacing entries, at least of the clients is restricted, and when a cache miss results from a request by the restricted client, the entry to be replaced is selected from a fixed subset of the cache entries. When a cache misses results from a request by any client other than the restricted client, any cache entry, including a restricted entry, can be selected to be replaced.

17 Claims, 6 Drawing Sheets

SHARED CACHE WITH CLIENT-SPECIFIC REPLACEMENT POLICY

BACKGROUND OF THE INVENTION

The present invention relates in general to processor cache systems, and in particular to a shared cache that uses a client-specific replacement policy.

Most computer systems in use today include a processor and a memory device. The processor executes operations, and the memory device stores information needed by the processor, including instructions identifying the operations to execute, data to be operated on, and data resulting from operations. The instructions generally include memory access instructions for reading data from and writing data to the memory device.

Frequently, the memory is managed using virtual addressing, which enables shared memory management to be separated from program design. Systems that use virtual addressing generally include a page table that provides mapping information usable to translate virtual addresses (which are used in program instructions) to physical addresses (which designate specific locations in a memory device) during execution of instructions. The page table is usually stored in system memory at a physical address known to the processor, and during execution of a memory access command, the processor first accesses the page table to obtain the mapping information, then translates the virtual address to a physical address and accesses the memory again using the physical address.

To reduce the average latency associated with memory instructions, the processor typically includes a translation lookaside buffer (TLB). The TLB includes a cache of previously retrieved mapping information from the page table. The cache contains a number of entries, each representing a mapping from virtual address space to physical address space. Typically, each cache entry includes the virtual address (or a portion thereof) as a tag associated with the corresponding mapping information, which might be a physical address or other information from which a physical address can be determined. When a translation of a virtual address is requested, the TLB performs an associative lookup based on the virtual address to determine whether the mapping information is present in the cache. If the information is present (a "cache hit"), the TLB uses the cached information to perform the translation without accessing the page table. If the information is not present (a "cache miss"), the TLB accesses the page table to retrieve the mapping information and adds the retrieved information to the cache for possible reuse.

To provide high speed, the cache size is usually limited to a relatively small number of entries, and once the cache is full, a new entry can be stored only by evicting and replacing a previous entry. The choice of which entry to replace is generally made based on which entry is least likely to be used again. Commonly, entries are selected for replacement based on recency of use, with the least recently used entry being selected for replacement. To reliably identify the least recently used (LRU) entry, each cache entry typically includes (or is associated with) LRU data representing how recently that entry was accessed, relative to the other cache entries. Counters, bit masks, or the like are commonly used. Each time a cache hit occurs, the LRU data associated with various entries is updated to indicate that the entry that hit is now the most recently used. Each time a cache miss occurs, the LRU data is used to identify the least recently used entry, which is replaced with the newly retrieved mapping information, and the LRU data is updated to indicate that the new entry is now the most recently used.

Cache systems can be as large as desired and can include multiple levels. For instance, many TLB systems use a two-level cache, with a relatively small and very fast Level 1 (L1) cache backed by a larger and somewhat slower Level 2 (L2) cache. In the event of a cache miss at L1, the L2 cache is checked; the page table is accessed only if a miss occurs at L2 as well. The L1 and L2 caches each operate using separate LRU data.

A TLB improves performance to the extent that it reduces the need to access the page table. The improvement is generally a reflection of the "hit rate," i.e., the fraction of translation requests that result in a cache hit. The hit rate will tend to be higher when the successive virtual addresses being accessed are localized, i.e., near each other in address space, so that one page table mapping can be retrieved once, cached, and reused from the cache to satisfy multiple translation requests. The extent to which successive requests are localized depends largely on the nature of the instruction stream and can vary considerably from one application or process to another.

TLB performance can be significantly undermined in some processor architectures that support execution of multiple instruction streams in parallel, e.g., using multiple hardware cores or multiple threads that share a core. Each instruction stream typically includes its own stream of memory access requests that has no expected correlation to activity in other streams. For instance, in a graphics processor, a stream of requests for texture data might be generated in parallel with a stream of requests for pixels to be displayed.

If the different parallel processes use the same TLB for address translations, they tend to compete with each other for space in the cache. For instance, virtual addressing is used in some graphics processors that access system memory. Such processors typically run a display (scanout) process that accesses pixel data in a highly localized manner, e.g., sequentially in the virtual address space. But such processors also run other processes whose memory access patterns exhibit far less localization, such as texture processes. Under some conditions, mapping information retrieved in response to requests from the texture process can evict cache entries that are still being used to respond to requests from the display process, which increases the cache miss rate of the display requests and also causes the same data to be repeatedly retrieved from the page table rather than reused from the cache. This thrashing behavior, like all types of thrashing behavior, hurts system performance and is generally not desired.

In some parallel processing systems, thrashing between processes is avoided by physically or logically dividing the cache and allocating different caches, or different portions of the cache, to different clients of the TLB, where "client" refers to a process, thread, execution core or the like whose memory requests are serviced by the TLB. For instance, in a graphics processor the texture client might be allocated its own cache, while display and other well-behaved clients are allocated a different cache. This arrangement prevents the texture client from evicting cache entries that are still actively being used by the other clients. However, when any client requests a mapping that is not stored in the cache allocated to that client, a cache miss occurs even if the mapping happens to be stored in a cache allocated to another client. This decreases the overall cache hit rate. In addition, as a result of such a miss, a duplicate of the mapping that is already in the other client's cache is added to the requesting client's cache, making inefficient use of the limited cache capacity and further decreasing the overall hit rate.

It would therefore be desirable to provide a cache system capable of more efficiently handling requests from multiple clients.

BRIEF SUMMARY OF THE INVENTION

Embodiments of the present invention provide shared caches with a client-specific replacement policy. Access to the cache is shared among multiple clients, and a request from any client can hit anywhere in the cache. For purposes of cache eviction and replacement, one (or more) of the clients is restricted, meaning that when a cache miss results from a request by that client, the entry to be replaced is selected from a fixed subset of the cache entries, referred to herein as "restricted entries" or "restricted cache entries." When a cache misses results from a request by any client other than the restricted client, any cache entry, including a restricted entry, can be selected to be replaced.

According to one aspect of the present invention, a method of operating a cache having cache entries for storing data is provided. A subset of the cache entries are identified as restricted cache entries. Requests for data are received from clients including a restricted client. In response to each request for data, a cache hit or a cache miss is detected; specifically, a cache hit is detected in the event that the requested data is stored in any one of the cache entries, and a cache miss is detected in the event that the requested data is not stored in any one of the cache entries. In the event that a cache miss is detected in response to a request from the restricted client, one of the restricted cache entries is selected to be replaced with new data. In the event that a cache miss is detected in response to a request from a client other than the restricted client, any one of the cache entries is selected to be replaced with new data. The new data can be retrieved from a backing store and stored in the selected entry Selection of a cache entry to replace can be made in various ways. In some embodiments, when a cache miss is detected in response to a request from a client other than the restricted client, the cache entry least recently used in response to a request from any one of the plurality of clients is selected to be replaced, and when a cache miss is detected in response to a request from the restricted client, the restricted cache entry least recently used in response to a request from the restricted client is selected to be replaced.

In some embodiments, global replacement information is stored for each of the cache entries, and restricted replacement information for each of the restricted cache entries. The global replacement information is used to select any one of the cache entries to be replaced with new data in the event that a cache miss is detected in response to a request from a client other than the restricted client, and the restricted replacement information is used to select one of the restricted cache entries to be replaced with new data in the event that a cache miss is detected in response to a request from the restricted client. The global replacement information may include, for example, global recency information indicating which one of the cache entries was least recently used in response to a request from any one of the clients. The restricted replacement information may include, for example, restricted recency information indicating which one of the restricted cache entries was least recently used in response to a request from the restricted client. In the event that a cache hit is detected, the global replacement information is updated, and if requesting client is the restricted client, the restricted replacement information is also updated.

Any type of data may be stored in the cache. For instance, in some embodiments, the data stored in each cache entry includes mapping information for translating a virtual address to a physical address.

The cache may be used in any type of processor. In some embodiments, the cache is in a graphics processor and at least one of the clients is a process that performs rendering operations.

According to another aspect of the present invention, a cache system for a processor includes an input path, a cache, a cache lookup circuit, and a cache control circuit. The input path is configured to receive requests for data originating from various clients including a restricted client. The cache is configured to store data in cache entries, wherein a subset of the cache entries are restricted cache entries. The cache lookup circuit is coupled to the input path and the cache and is configured to detect a cache hit or a cache miss in response to each request for data, wherein a cache hit is detected in the event that the requested data is stored in any one of the cache entries and a cache miss is detected in the event that the requested data is not stored in any one of the cache entries. The cache control circuit is coupled to the cache lookup circuit and is configured to select one of the restricted cache entries to be replaced with new data in the event that a cache miss is detected in response to a request originating from the restricted client and to select any one of the cache entries to be replaced with new data in the event that a cache hit is detected in response to a request originating from a client other than the restricted client. In some embodiments, the cache system also includes a backing store access circuit coupled to the cache lookup circuit and configured to retrieve the new data from a backing store in the event of a cache miss.

In some embodiments, the cache is further configured to store global recency information for each cache entry and to store restricted recency information for each restricted cache entry. The global recency information indicates which one of the cache entries was least recently used in response to a request from any one of the clients, and the restricted recency information indicates which one of the restricted cache entries was least recently used in response to a request from the restricted client. The cache control circuit can be further configured to update the global recency information in the event that a cache hit is detected in response to a request originating from any one of the clients and to also update the restricted recency information in the event that the request originated from the restricted client.

According to still another aspect of the present invention, a translation lookaside buffer system includes an input arbitration unit and an address translation unit. The input arbitration unit is configured to receive memory access requests, each of which includes a virtual address, from clients including a restricted client and to select a request to process. The address translation unit, which is configured to translate the virtual address for the selected request to a physical address, includes a cache, a cache lookup circuit, a cache control circuit, and a page table access circuit. The cache has cache entries, each cache entry configured to store address mapping information usable to translate a virtual address to a physical address. A subset of the cache entries are restricted cache entries. The cache lookup circuit is coupled to receive the virtual address for the selected request and is configured to access the cache using the virtual address to detect a cache hit or a cache miss; specifically, a cache hit is detected in the event that mapping information for the virtual address is stored in any one of the cache entries and a cache miss is detected in the event that the mapping information for the virtual address is not stored in any one of the cache entries. The cache control circuit is coupled to the cache lookup circuit and is configured to select one of the restricted cache entries to be replaced with new mapping information in the event that a cache miss is detected in response to a request originating from the restricted client and to select any one of the cache entries to be replaced with new mapping information in the event that a cache hit is detected in response to a request originating from a client other than the restricted client. The page table access circuit is configured to receive the virtual address in the event of a cache miss and to access a page table to retrieve the mapping information for the virtual address. In some embodiments, the translation lookaside buffer system of claim also includes a memory agent configured to receive the memory request and the physical address from the address translation unit and to transmit the memory request to a memory device that is accessible using the physical address.

The following detailed description together with the accompanying drawings will provide a better understanding of the nature and advantages of the present invention.

DETAILED DESCRIPTION OF THE INVENTION

Embodiments of the present invention provide shared caches with a client-specific replacement policy. Access to the cache is shared among multiple clients, and a request from any client can hit anywhere in the cache. For purposes of cache eviction and replacement, one (or more) of the clients is restricted, meaning that when a cache miss results from a request by that client, the entry to be replaced is selected from a fixed subset of the cache entries, referred to herein as "restricted entries" or "restricted cache entries." When a cache misses results from a request by any client other than the restricted client, any cache entry, including a restricted entry, can be selected to be replaced.

In some embodiments, client-specific replacement behavior is provided by maintaining two types of replacement information (e.g., LRU data), with the first set providing global replacement information based on access by any client and the second set providing replacement information based only on access by the restricted client. The global replacement information is updated in response to a cache hit from any client including the restricted client, while the restricted replacement information is updated in response to a cache hit from the restricted client but not in response to a cache hit from any other client. In the event of a cache miss from the restricted client, the restricted replacement information is used to select an entry in the restricted subset to be replaced; in the event of a cache miss from any other client, the global replacement data is used, and any entry may be replaced, including a restricted entry.

A cache with a client-specific replacement policy as described herein can be implemented as a translation lookaside buffer (TLB) cache in a graphics processor or any other processor that uses virtual addressing, or as any other type of cache of recently accessed information that is shared among multiple clients.

Figure 1:
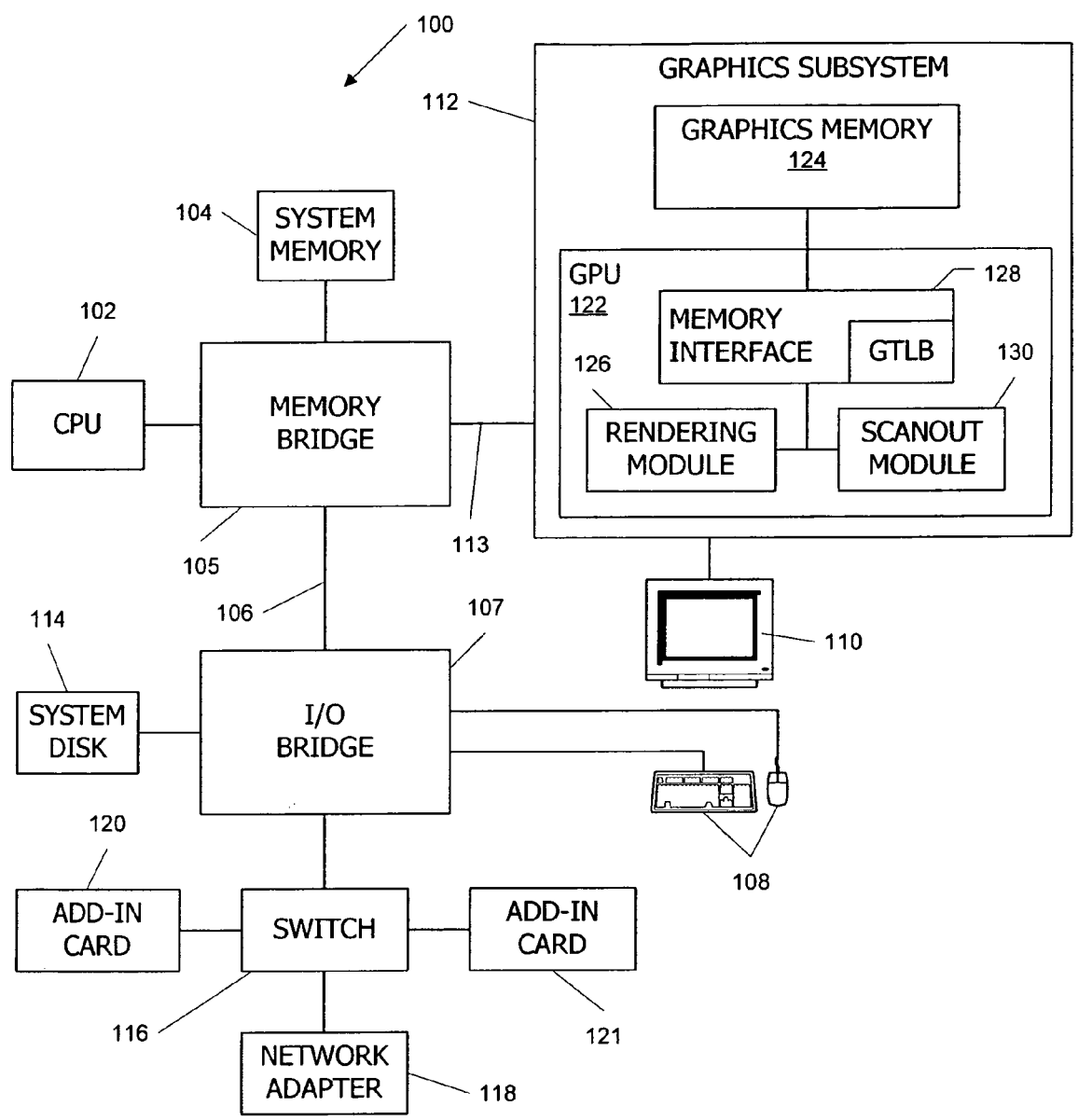
FIG. 1 is a block diagram of a computer system according to an embodiment of the present invention.

FIG. 1 is a block diagram of a computer system 100 according to an embodiment of the present invention. Computer system 100 includes a central processing unit (CPU) 102 and a system memory 104 communicating via a bus path that includes a memory bridge 105. Memory bridge 105 is connected via a bus path 106 to an I/O (input/output) bridge 107. I/O bridge 107 receives user input from one or more user input devices 108 (e.g., keyboard, mouse) and forwards the input to CPU 102 via bus 106 and memory bridge 105. Visual output is provided on a pixel based display device 110 (e.g., a conventional CRT or LCD based monitor) operating under control of a graphics subsystem 112 coupled to memory bridge 105 via a bus 113. A system disk 114 is also connected to I/O bridge 107. A switch 116 provides connections between I/O bridge 107 and other components such as a network adapter 118 and various add-in cards 120, 121. Other components (not explicitly shown), including USB or other port connections, CD drives, DVD drives, and the like, may also be connected to I/O bridge 107. Bus connections among the various components may be implemented using bus protocols such as PCI (Peripheral Component Interconnect), PCI Express (PCI-E), AGP (Advanced Graphics Processing), Hypertransport, or any other bus protocol(s), and connections between different devices may use different protocols as is known in the art.

Graphics processing subsystem 112 includes a graphics processing unit (GPU) 122 and a graphics memory 124, which may be implemented, e.g., using one or more integrated circuit devices such as programmable processors, application specific integrated circuits (ASICs), and memory devices. GPU 122 includes a rendering module 126, a memory interface module 128, and a scanout module 130. Rendering module 126 may be configured to perform various tasks related to generating pixel data from graphics data supplied via bus 113 (e.g., implementing various 2-D and or 3-D rendering algorithms), interacting with memory interface 128 to store and update pixel data, and the like. The particular configuration of rendering module 126 may be varied as desired, and a detailed description is omitted as not being critical to understanding the present invention.

Memory interface module 128, which communicates with rendering module 126 and scanout module 130, manages all interactions with graphics memory 124. Memory interface module 128 may also include pathways for writing pixel data received via bus 113 to graphics memory 124 without processing by rendering module 128. Memory interface module 128 is configured to service memory access requests from multiple clients, including various components of rendering module 126 (rasterizer, shader, texture, etc.)

In accordance with an embodiment of the present invention, graphics subsystem 112 accesses system memory for at least some of its operations, and memory interface module 128 is configured to translate virtual addresses to physical addresses via a graphics address translation lookaside buffer (GTLB) 129 with a cache (not explicitly shown) managed using a client-specific replacement policy that prevents certain clients, such as texture, from thrashing all of the cache entries. Operation of GTLB 129 is described below. Other aspects of memory interface module 128 may be varied as desired, and a detailed description is omitted as not being critical to understanding the present invention.

Scanout module 130 reads pixel color data from a pixel buffer that may be located, e.g., in graphics memory 124 or system memory 104 and transfers the data to display device 110 to be displayed. In one embodiment, scanout module 130 operates isochronously, scanning out frames of pixel data at a prescribed refresh rate (e.g., 80 Hz) regardless of any other activity that may be occurring in GPU 122 or elsewhere in system 100. In some embodiments, the prescribed refresh rate can be a user selectable parameter, and the scanout order may be varied as appropriate to the display format (e.g., interlaced or progressive scan). Scanout module 130 may also perform other operations, such as adjusting color values for particular display hardware and/or generating composite screen images by combining the pixel data from pixel buffer 132 with data for a video or cursor overlay image or the like, which may be obtained, e.g., from graphics memory 124, system memory 104, or another data source (not shown). The particular configuration of scanout module 130 may be varied as desired, and a detailed description is omitted as not being critical to understanding the present invention.

In operation, CPU 102 is the master processor of system 100, controlling and coordinating operations of other system components. In particular, CPU 102 issues commands that control the operation of GPU 122. In some embodiments, CPU 102 writes a stream of commands for GPU 122 to a command buffer, which may be in system memory 104, graphics memory 124, or another storage location accessible to both CPU 102 and GPU 122. GPU 122 reads the command stream from the command buffer and executes commands asynchronously with operation of CPU 102, as is known in the art.

It will be appreciated that the system shown herein is illustrative and that variations and modifications are possible. The bus topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, graphics subsystem 112 is connected to I/O bridge 107 rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of GPU 122 to the rest of system 100 may also be varied. In some embodiments, graphics system 112 is implemented as an add-in card that can be inserted into an expansion slot of system 100. In other embodiments, a GPU is integrated on a single chip with a bus bridge, such as memory bridge 105 or I/O bridge 107. A GPU may be provided with any amount of local graphics memory, including no local memory, and may use local memory and system memory in any combination. It is also to be understood that any number of GPUs may be included in a system, e.g., by including multiple GPUs on a single graphics card or by connecting multiple graphics cards to bus 113. Multiple GPUs may be operated in parallel to generate images for the same display device or for different display devices.

In addition, GPUs embodying aspects of the present invention may be incorporated into a variety of devices, including general purpose computer systems, video game consoles and other special purpose computer systems, DVD players, handheld devices such as mobile phones or personal digital assistants, and so on.

Figure 2:
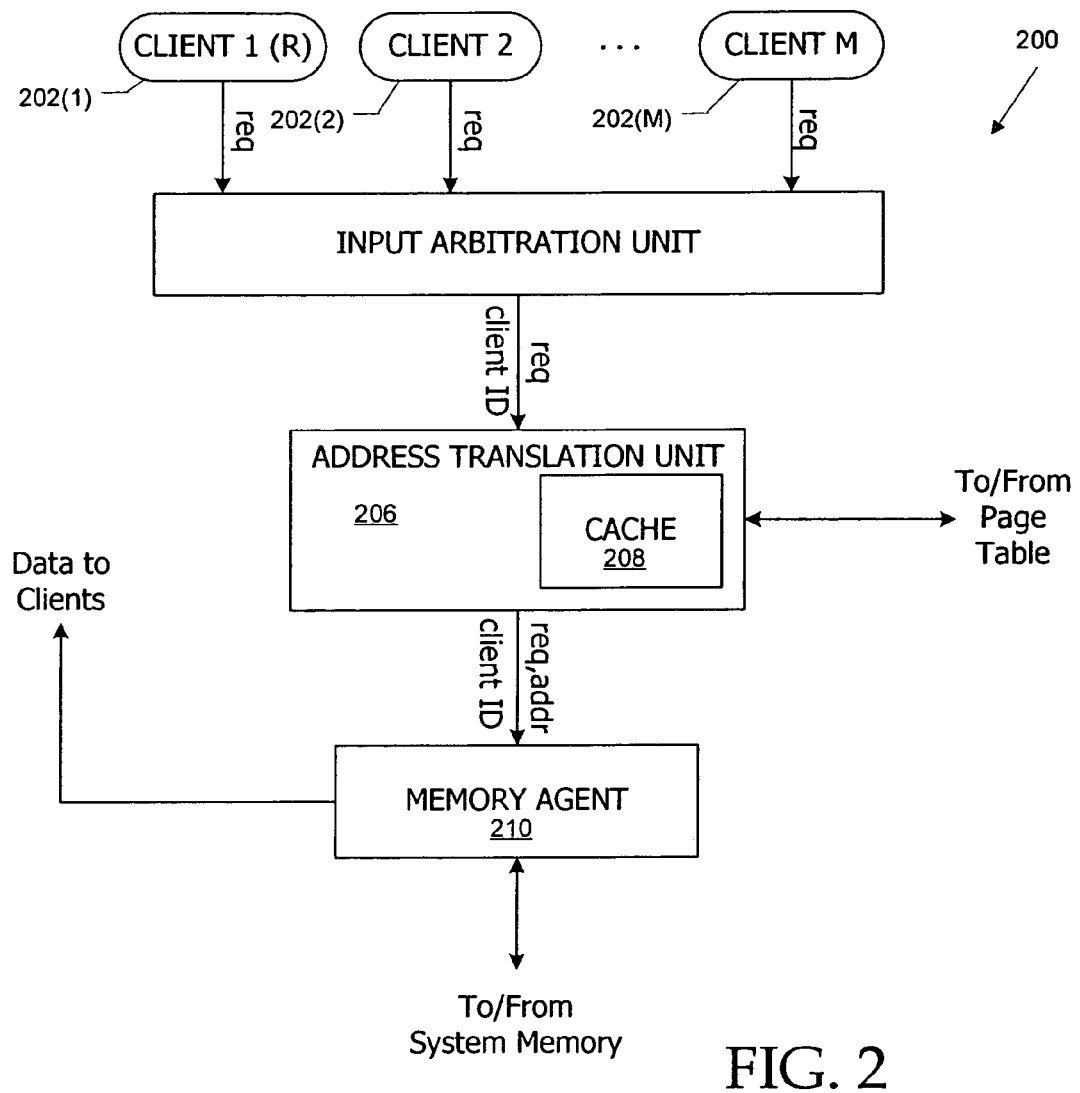
FIG. 2 is a block diagram of a translation lookaside buffer (TLB) pipeline according to an embodiment of the present invention.

FIG. 2 is a block diagram of a TLB system 200 that may be used to implement GTLB 129 according to an embodiment of the present invention and that may also be used in other processors where a TLB capable of servicing multiple clients is desired. TLB system 200 provides address translation services for a number M of clients 202(1)-202(M). (Herein, multiple instances of like objects are denoted with reference numbers identifying the object and parenthetical numbers identifying the instance where needed.) Clients 202 may be any clients that require address translation services. For instance, in a graphics processor with multiple execution cores that operate in parallel, each execution core might correspond to a client.

In this embodiment, client 202(1) is identified as a restricted client, as indicated by the label "R" in FIG. 2. "Restricted client," as used herein, signifies that the pool of entries in the TLB cache that can be evicted in response to requests from client 202(1) is limited to a subset of the cache entries. As described below, there is no corresponding restriction as to which cache entry can yield a hit in response to a request from client 202(1). Other clients 202(2) to 202(M), referred to herein as "unrestricted clients," are not restricted as to which cache entries can be evicted in response to their requests or as to which entries can yield a hit. Restricted status is advantageously assigned to clients that make frequent system memory accesses with relatively little reuse of mapping information. For instance, in the case of a GPU, a client that performs texture fetching operations might be made a restricted client since texture fetching often does not exhibit localized access in the virtual address space. In some embodiments, designation of a client as restricted affects only TLB cache replacement and does not otherwise affect operation of the client.

The restricted client can be designated in various ways. In some embodiments, a particular hardware source, such as a texture fetch unit, that generates memory requests is permanently identified as a restricted client, e.g., by hardwiring connections from the source to the TLB system. In other embodiments, the system can be configured to identify a particular client as restricted; for instance, a graphics driver program may set appropriate configuration parameters in the TLB during system startup.

TLB system 200 includes an input arbitration unit 204, an address translation unit 206 with a cache 208, and a memory agent 210. Input arbitration unit 204 receives memory access requests from clients 202(1) to 202(M). Each request (req) specifies a virtual address (vAddr, not explicitly shown in FIG. 2) and a memory operation to be performed, e.g., read or write. On each clock cycle, input arbitration unit 204 selects a request from one of the clients to be forwarded to the next stage.

Input arbitration unit 204 may be of generally conventional design and may include FIFOs, buffers, or other circuits for queuing requests from each of the M clients until they can be processed, as well as arbitration logic configured to select a next request from one of the clients to be processed. Conventional arbitration algorithms including round-robin, recency-based, and/or priority-based arbitration may be used.

Before forwarding the selected request to the next stage, input arbitration unit 204 advantageously adds a client identifier (client ID) to the request if the request as received from the client does not already include a client ID. The client ID is used to direct a response to each memory access request back to the requesting client and may also be used by address translation unit 206 to determine whether the requesting client is a restricted or unrestricted client.

Address translation unit 206 receives the requests, including virtual addresses and client IDs, from input arbitration unit 204 and translates the virtual addresses to physical addresses. Address translation unit 206 is advantageously configured to access a page table (which may be located, e.g., in system memory) that may be of generally conventional design. In some embodiments, the page table stores a starting physical address (pAddr) corresponding to each page in virtual address space; in other embodiments, the page table stores other mapping information that address translation unit 206 can use to generate the physical address corresponding to a given virtual address Address translation unit 206 includes a cache 208 configured to store a number N of entries representing recently accessed address mappings. In response to a request, address translation unit 206 first determines whether the translation data is already stored in cache 208 and accesses the page table only in the event of a cache miss. Detection of a cache hit or miss advantageously does not depend on whether the request was made by a restricted client or an unrestricted client; in other words, any request can hit any entry in the cache. When new mapping information is retrieved from the page table in response to a cache miss, the new information is stored in cache 208 for subsequent reuse, with an old entry being replaced if the cache is full. Selection of an entry to replace advantageously depends on whether the data was retrieved in response to a request from a restricted client or an unrestricted client.

Figure 3:
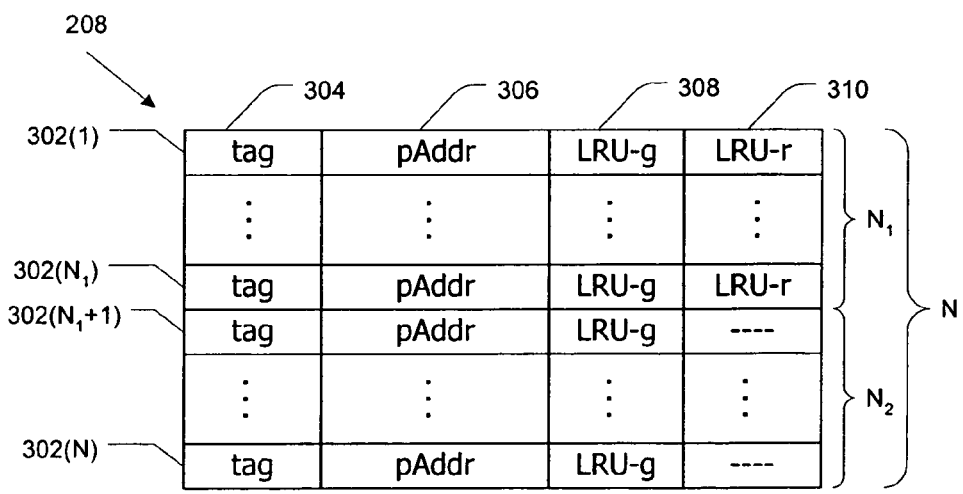
FIG. 3 is a table illustrating the structure of a TLB cache according to an embodiment of the present invention.

FIG. 3 is a table illustrating a structure of cache 208 according to an embodiment of the present invention. Cache 208 has a number N of entries 302. Each entry 302 includes a tag 304, a data field 306, a global least-recently used (LRU-g) field 308 and a restricted LRU (LRU-r) field 310.

Tag 304 is a representation of a virtual address vAddr. In one embodiment, the tag is the starting virtual address of the page that contains the requested virtual address; other representations can also be used. Data field 306 stores the mapping information corresponding to the virtual address represented by tag 304. As noted above, the mapping information might be the physical address (pAddr) corresponding to the starting address of the page in virtual memory; any other information from which address translation unit 206 can determine the physical address may be used instead. In one embodiment, cache 208 is implemented as associative memory so that the virtual address included in a request can be used to look up the corresponding mapping information or determine that the information is not present in the cache. Other implementations may also be used.

Cache 208 is advantageously limited to a predetermined size N, which may be 12 or 24 or some other number depending on implementation. When cache 208 is full, each cache miss results in address translation unit 206 replacing the least recently used cache entry with an entry representing a mapping newly retrieved from the page table. In accordance with an embodiment of the present invention, selection of the cache entry to replace depends on whether the client whose request resulted in the cache miss is a restricted client or an unrestricted client.

Specifically, in one embodiment, only cache entries 302(1) to 302($N_1$), referred to herein as "restricted entries," can be replaced in response to a cache miss that resulted from a request by restricted client 202(1). The restricted entries form a proper subset of the cache; in other words, $N_1$ is always less than N. For instance, if N is 12, $N_1$ might be 3, 6, 9 or any other number greater than zero and less than 12. In general, the choice of $N_1$ may depend in part on the total cache size (N) and in part on the expected behavior of various clients, which is implementation-dependent.

Any one of entries 302(1) to 302(N), including restricted entries 302(1) to 302($N_1$), can be replaced in response to a cache miss that resulted from a request by an unrestricted client 202(2) to 202(M).

To provide the desired behavior, "restricted" replacement information representing patterns of use of restricted entries 302(1) to 302($N_1$) by restricted client 202(1) is maintained in addition to "global" replacement information representing the pattern of use of all entries 302 by all clients 202. In one embodiment, global replacement information is maintained using LRU-g field 308, which stores information representing which entry 302 was least recently accessed in response to a request from any client 202 (including restricted and unrestricted clients), and restricted replacement information is maintained using LRU-r field 310, which stores information representing which of restricted entry 302(1) to 302($N_1$) was least recently accessed by restricted client 302(1). The recency information in each field may be represented in a conventional form (e.g., count values, bit fields, etc.).

It should be noted that LRU-r field 310 is not populated for all entries in cache 208. Instead, LRU-r field 310 is populated only for the restricted entries 302(1) to 302($N_1$). In some embodiments, the remaining $N_2$ entries 302($N_1$+1) to 302(N) include LRU-r fields that are kept unpopulated by suitably configured control logic; in other embodiments, entries 302($N_1$+1) to 302(N) do not include LRU-r fields. As described below, when new mapping information is retrieved from the page table in response to a request from the restricted client, one of entries 302(1) to 302($N_1$) is replaced with the new information, with the selection of the entry to replace being made based on LRU-r field 310. When mapping information is retrieved from the page table in response to a request from an unrestricted client, one of entries 302(1) to 302(N) is evicted in favor of the new data, with the selection being made based on LRU-g field 308. Operation of address translation unit 206, including management of cache 208, is described further below.

Referring again to FIG. 2, once the physical address corresponding to the virtual address for a client's request has been determined, address translation unit 206 forwards the request, including the physical address pAddr and the client ID, to memory agent 210. Memory agent 210, which may be of generally conventional design, interacts with system memory 104 (FIG. 1) to perform the memory access operations (e.g., read or write) requested by the clients. Memory agent 210 also receives any response to the operations from system memory 104, and returns each response to the requesting one of clients 202(1) to 202(N). In the case of a read request, the response advantageously includes the requested data; in the case of a write request, the response may simply provide an indication of completion status (e.g., success or failure). In some embodiments, memory agent 210 may also handle page table access request initiated by address translation unit 206.

It will be appreciated that the TLB system described herein is illustrative and that variations and modifications are possible. For instance, address translation unit 206 can include appropriate circuitry configured to compute a physical address using the mapping information and the virtual address. In some embodiments for graphics systems, the address translation unit might include a tiler that converts virtual addresses received from the clients to tile-based virtual addresses prior to translation of the virtual addresses to physical addresses. (As is known in the art, tiled addressing in a pixel buffer can improve the efficiency of many rendering operations.) Numerous algorithms for tiling that may be implemented in a tiler are known in the art, and tiling may be performed or not on a per-client or per-request basis (e.g., in some embodiments, only virtual addresses corresponding to the pixel buffer are tiled).

In some embodiments, the address translation unit may include a multi-level cache structure, and cache 208 as shown in FIG. 3 may be implemented at any cache level. For instance, cache 208 might be used as a level-1 cache, and a separate level-2 cache might be provided. Replacement of entries in the level-2 cache might also be controlled in the client-specific manner described herein, or it might be controlled using conventional techniques (e.g., client-independent eviction or physical or logical subdivision of the level-2 cache).

In some embodiments, some or all of the clients may explicitly request address translations in addition to or instead of memory access operations. Address translation requests can be handled in the same manner as memory access requests, except that instead of sending a request to system memory, the memory agent would simply return the physical address provided by the address translation unit to the requesting client.

Figure 4:
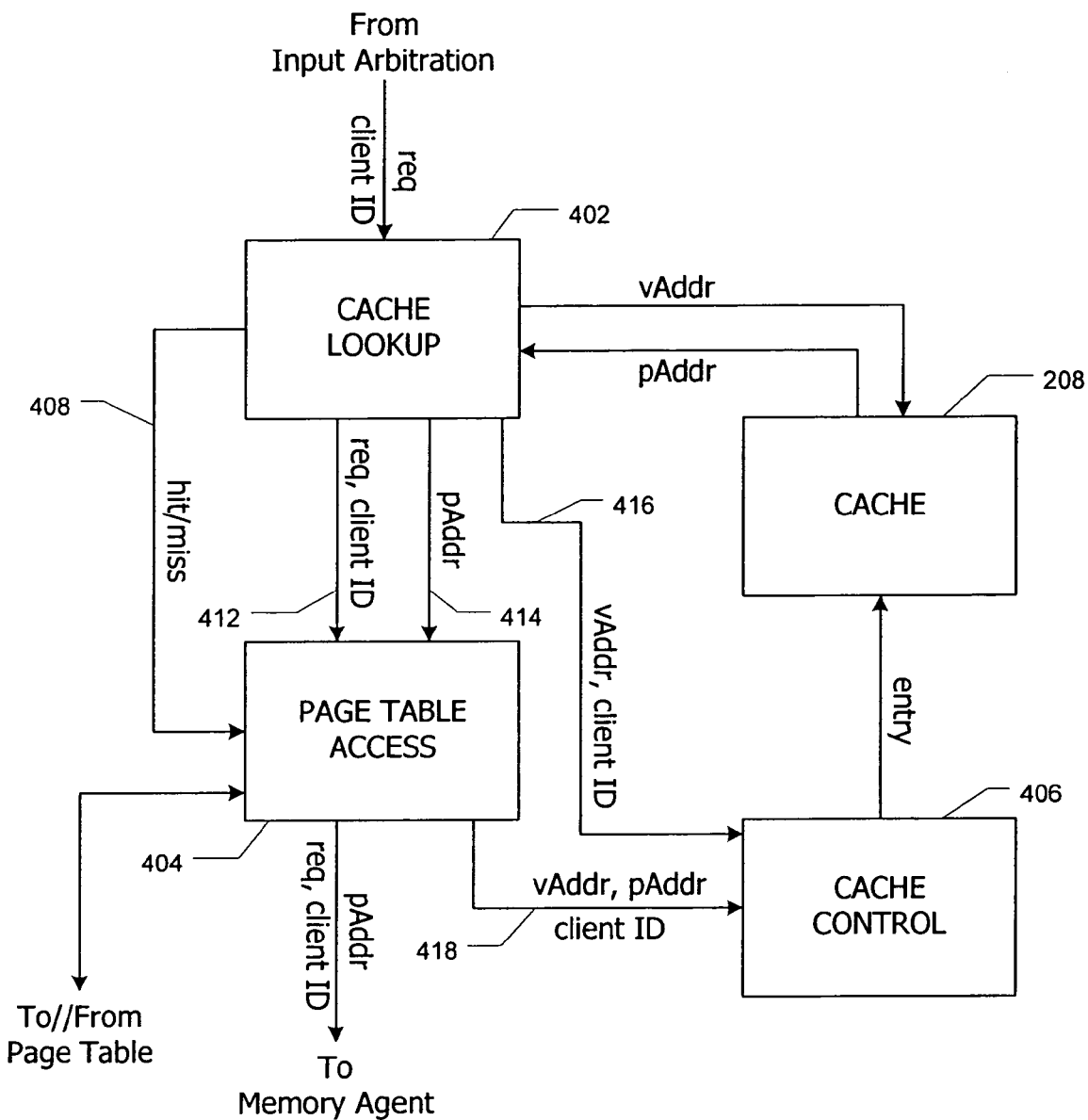
FIG. 4 is a block diagram of an address translation unit for a TLB pipeline according to an embodiment of the present invention.

FIG. 4 is a block diagram of address translation unit 206 according to an embodiment of the present invention. In addition to cache 208, address translation unit 206 includes a cache lookup circuit 402, a page table access circuit 404, and a cache control circuit 406.

Cache lookup circuit 402 receives the request from input arbitration unit 204 of FIG. 2 and extracts the virtual address vAddr, then accesses cache 208 using virtual address vAddr to retrieve a corresponding physical address pAddr. In the event of a cache hit, cache lookup circuit 402 delivers the physical address pAddr (on path 414) together with the request (on path 412) to page table access circuit 404 and also asserts a "hit" signal on hit/miss signal path 408. Cache lookup circuit 402 also updates the LRU-g and LRU-r information in cache 208 based on whether the request was made by a restricted or unrestricted client by sending the virtual address vAddr that hit and the requesting client ID to cache control circuit 406 on path 418. In the event of a cache miss, cache lookup circuit 402 delivers the request to page table access circuit 404 for processing and also asserts a "miss" signal on path 408.

Figure 5:
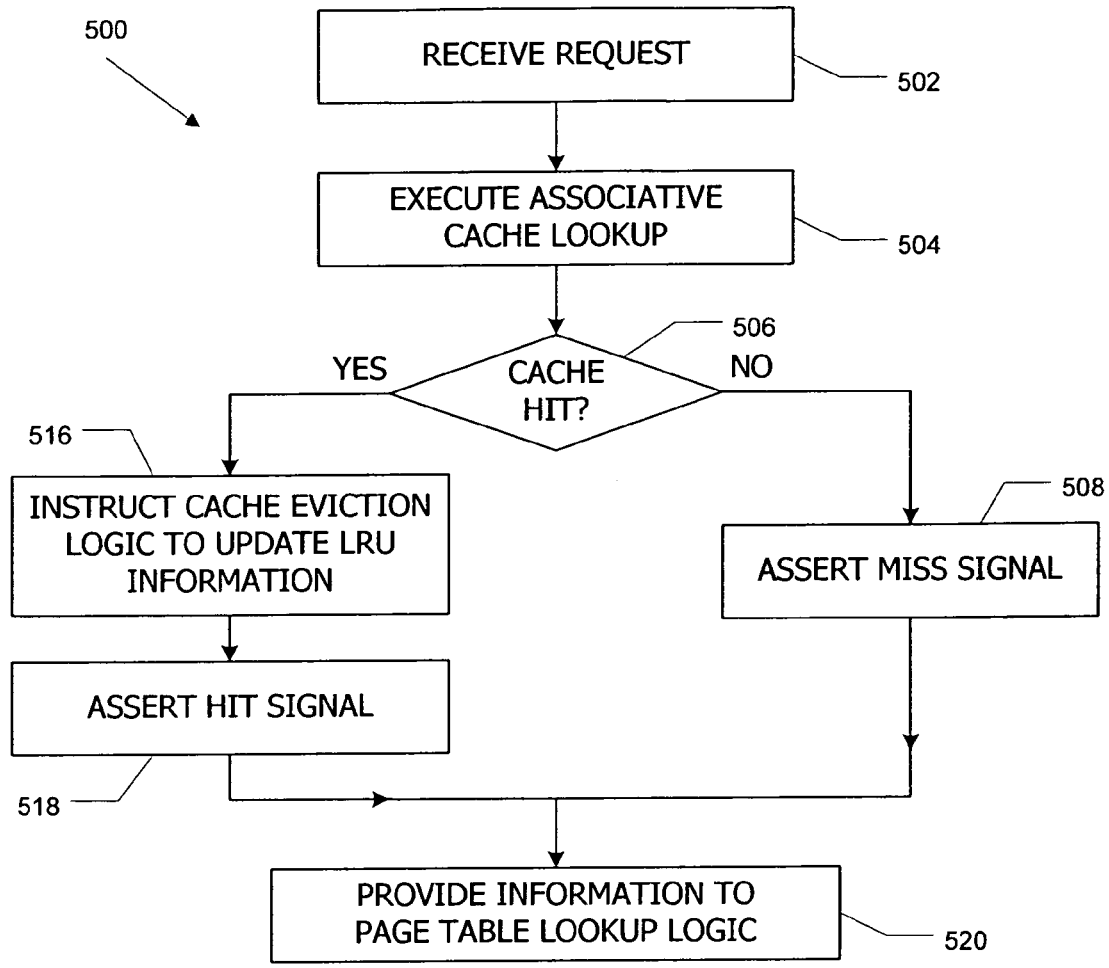
FIG. 5 is a flow diagram of a cache lookup logic process according to an embodiment of the present invention.

FIG. 5 is a flow diagram of a process 500 implemented in cache lookup circuit 402 according to an embodiment of the present invention. At step 502, cache lookup circuit 402 receives a request from input arbitration unit 204 (FIG. 2). The request includes, or is associated with, a client ID of the requesting client.

At step 504, cache lookup circuit 402 extracts the virtual address vAddr from the request and executes an associative lookup in cache 208. If the virtual address vAddr matches the tag 304 (FIG. 3) for any entry 302, cache 208 returns the corresponding mapping information (e.g., pAddr) from data field 306 of the entry that hit; if vAddr does not match any tag 304, cache 208 returns an indication of a cache miss. It should be noted that the lookup operation is advantageously not client-specific; a request from any client 202, including restricted client 202(1) can hit any entry 302(1) to 302($N_1$) in cache 208.

At step 506, cache lookup circuit 402 detects whether a cache hit or cache miss has occurred. If a cache miss is detected, then at step 508 cache lookup circuit 402 asserts the miss signal on hit/miss signal path 408 and, at step 510, forwards the request via path 412 to page table access circuit 404. In some embodiments, cache lookup circuit 402 also forwards, via path 414, a value corresponding to an invalid mapping.

If, at step 506, a cache hit is detected, then at step 516 cache lookup circuit 402 instructs cache control circuit 406 (FIG. 4) to update the LRU information. Step 516 advantageously includes providing to cache control circuit 406, via signal path 416, the virtual address vAddr and the client ID. Cache control circuit 406 uses the client ID to determine which LRU field(s) to update, as described below. At step 518 of FIG. 5, cache lookup circuit 402 asserts the hit signal on hit/miss signal path 408 and, at step 510, provides information to page table access circuit 404, including the request and client ID on signal path 412 and the mapping information (e.g., physical address pAddr) retrieved from cache 208 on signal path 414. In some embodiments, page table access circuit 404 is configured to distinguish valid and invalid mapping values on path 414, and a separate hit/miss signal path 408 might be omitted.

It will be appreciated that the cache lookup process described herein is illustrative and that variations and modifications are possible. Steps described as sequential may be executed in parallel, order of steps may be varied, and steps may be modified or combined. For example, in one embodiment cache lookup circuit 402 does not communicate directly with cache control circuit 406. Instead, in the event of a cache hit, page table access circuit 404 forwards the virtual address vAddr that hit and the client ID, along with an indication that a cache hit occurred, to cache control circuit 406, which updates cache 208 as described below.

Referring again to FIG. 4, page table access circuit 404 is configured to receive the hit/miss signal on path 408, the request and client ID on path 412, and the mapping information (e.g., pAddr) on path 414. If the hit signal is asserted on path 408, page table access circuit 404 simply forwards the physical address pAddr from path 414 along with the request and client ID from path 412 to memory agent 210 (FIG. 2). If the miss signal is asserted on path 408, page table access circuit 404 ignores the value on path 414 and instead retrieves the mapping information from the page table using the virtual address vAddr included in the request on path 412, then forwards the retrieved mapping information along with the request and client ED from path 412 to memory agent 210. Page table circuit 404 also forwards the newly fetched information via path 418 to cache control circuit 406 for storage in cache 208. In some embodiments, the mapping information need not be the physical address; memory agent 210 can include circuitry configured to compute the physical address from the mapping information and virtual address.

Figure 6:
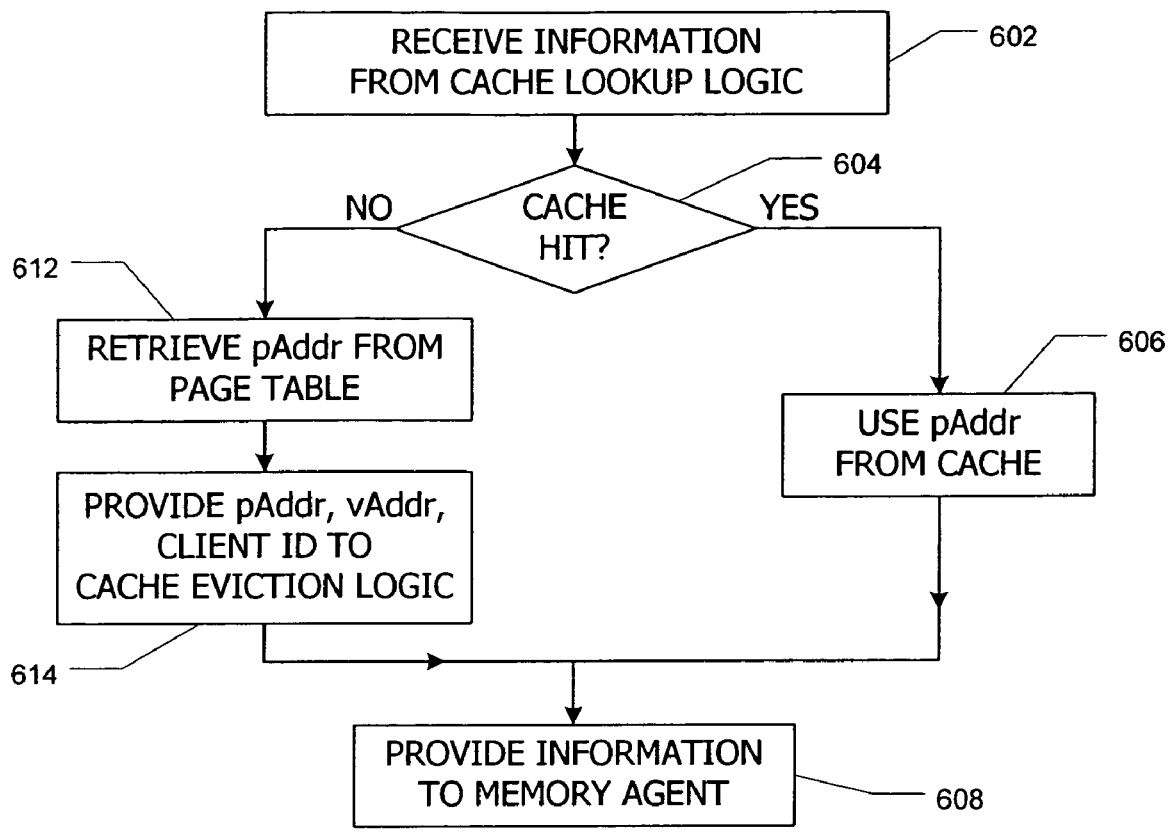
FIG. 6 is a flow diagram of a page table lookup logic process according to an embodiment of the present invention.

FIG. 6 is a flow diagram of a process 600 implemented in page table access circuit 404 according to an embodiment of the present invention. At step 602, page table access circuit 404 receives information from cache lookup circuit 402 via signal path 408 and paths 410, 412. At step 604, page table access circuit 404 determines whether a cache hit or cache miss occurred, e.g., by sampling the signal on path 408. In the event of a cache hit, at step 606, page table access circuit adds the mapping information (e.g., physical address pAddr) from path 414 to the request and client ID and, at step 608, forwards the information to memory agent 210.

If, at step 604, a cache miss occurred, then at step 612, page table access circuit 404 retrieves the address translation data from the page table. Conventional processes for accessing page table data may be used. At step 614, after the data has been retrieved, page table access circuit 404 provides the mapping information (e.g., physical address pAddr), virtual address vAddr, and client ID to cache control circuit 406. Cache control circuit 406 uses the client ID in determining which cache entry to evict in favor of the new information, as described below. At step 608, page table access circuit 404 forwards the physical address together with the request and client ID to memory agent 210.

It will be appreciated that the page table lookup logic described herein is illustrative and that variations and modifications are possible. Steps described as sequential may be executed in parallel, order of steps may be varied, and steps may be modified or combined.

For instance, in some embodiments, retrieving mapping information from the page table can introduce significant and/or variable latency. Page table access circuit 404 can be configured to process other requests while waiting for mapping information to be returned from the page table. Where this is the case, page table access circuit 404 may include buffers and reordering logic configured such that requests are delivered to memory agent 210 in the order of receipt by address translation unit 206, or requests may be delivered out-of-order to memory agent 210, which can be configured to execute the requests in order of receipt or to restore the original order, e.g., to handle read/write order dependencies or the like. Conventional techniques for managing variable latency in a TLB may be implemented.

Referring again to FIG. 4, cache control circuit 406 is configured to handle all updating of information in cache 208. Cache control circuit 406 advantageously implements restricted replacement for the restricted client and unrestricted replacement for unrestricted clients. That is, for cache 208 shown in FIG. 3, a cache miss resulting from a request by restricted client 202(1) can cause replacement of one of restricted entries 302(1) to 302($N_1$) but not one of entries 302($N_1$+1) to 302(N) while a cache miss resulting from a request by an unrestricted client 202(2) to 202(M) can cause replacement of any of entries 302(1) to 302(N), including restricted entries 302(1) to 302($N_1$).

Figure 7:
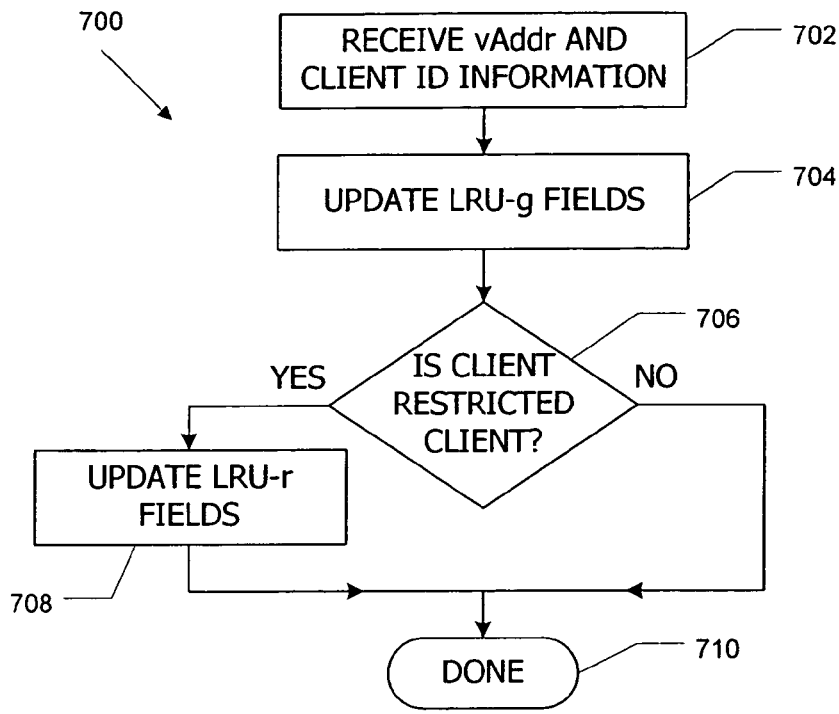
FIG. 7 is a flow diagram of a logic process for updating a TLB cache in response to a cache hit according to an embodiment of the present invention.

FIG. 7 is a flow diagram of a process 700 for updating cache 208 in response to a cache hit according to an embodiment of the present invention. Process 700 can be implemented in cache control circuit 406 and performed in response to the signals sent on path 416 in the event of a cache hit.

At step 702, a virtual address vAddr and client ID are received from cache lookup circuit 402. In some embodiments, the presence of these signals indicates a cache hit; in other embodiments a separate signal path (not shown in FIG. 4) may be provided to deliver a signal indicating a cache hit from cache lookup circuit 402.

At step 704, cache control circuit 406 updates the LRU-g information in field 308 for each cache entry 302 in cache 208 (FIG. 3). Conventional techniques for updating LRU information may be used, including, e.g., incrementing or decrementing count values, shifting bits, or the like. Thus, the LRU-g data reflects activity by all clients 202, including restricted client 202(1) as well as unrestricted clients 202(2) to 202(N).

At step 706, cache control circuit 406 determines whether the requesting client (identified by client ID) is restricted client 202(1). In one embodiment, cache control circuit 406 stores the ID value corresponding to the restricted client in a register, and step 706 includes comparing the content of the register to the received client ID. Other techniques may also be used. If the requesting client is the restricted client, then at step 708, cache control circuit 406 also updates the LRU-r info in field 310 for each cache entry 302(1) to 302($N_1$) in cache 208. Conventional techniques for updating LRU information may be used, but it should be noted that entries 302($N_1$+1) to 302(N) are not affected by the updating at step 708. In either event, process 700 ends at step 710.

Figure 8:
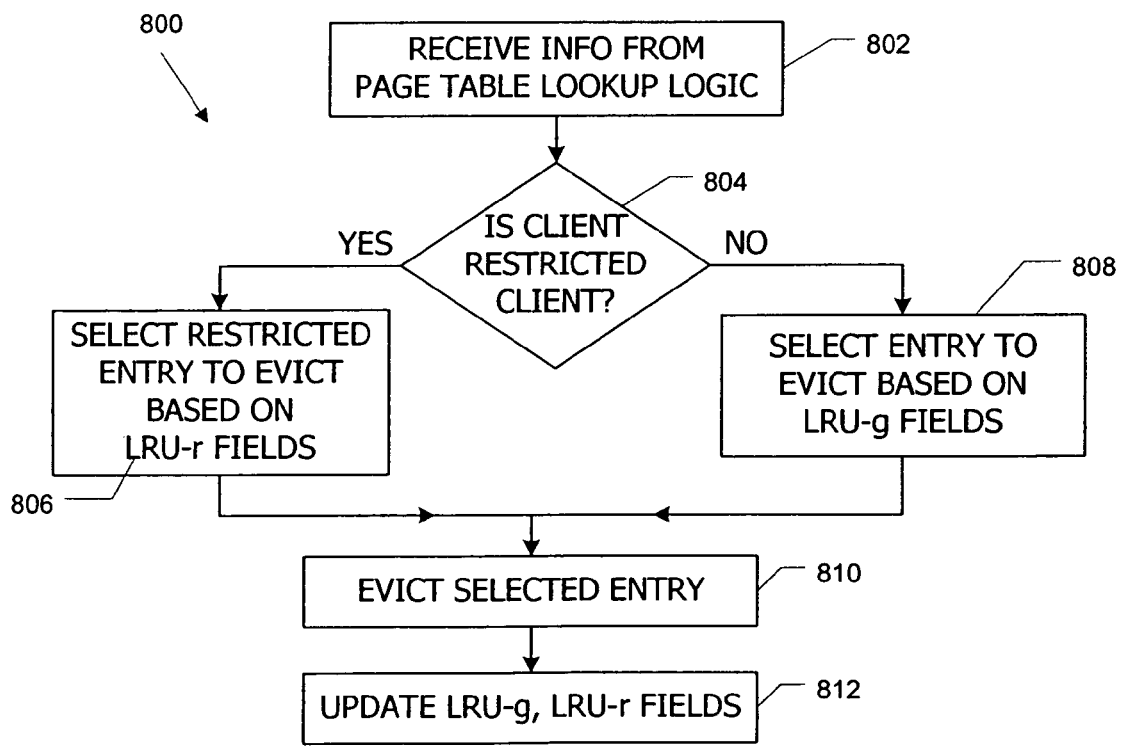
FIG. 8 is a flow diagram of a logic process for updating a TLB cache in response to a cache miss according to an embodiment of the present invention.

FIG. 8 is a flow diagram of a process 800 for updating cache 208 in response to a cache miss according to an embodiment of the present invention. Process 800 can be implemented in cache control circuit 406 and performed in response to the signals sent on path 418 in the event of a cache miss.

At step 802, a virtual address vAddr, the corresponding mapping information (e.g., physical address pAddr), and client ID are received from page table access circuit 404. In some embodiments, the presence of these signals indicates a cache miss; in other embodiments a separate signal path (not shown in FIG. 4) may be provided to deliver a signal indicating a cache miss from page table access circuit 404.

At step 804, cache control circuit 406 determines whether the client (identified by client ID) is restricted client 202(1). The same determination logic employed at step 706 of process 700 may also be employed at step 804. If the client is restricted client 202(1), then at step 806 cache control circuit 406 uses the LRU-r information in field 310 to select one of entries 302(1) to 302($N_1$) to be replaced with the new mapping information. If the client is not the restricted client, then at step 808 cache control circuit 406 uses the LRU-g information in field 308 to select one of entries 302(1) to 302(N) to be replaced with the new mapping information. Thus, requests from restricted client 202(1) can cause replacement only of a subset of the cache entries—in this embodiment, restricted entries 302(1) to 302($N_1$)—while requests from unrestricted clients 202(2) to 202(M) can cause replacement of any of the cache entries 302.

At step 810, the selected entry is replaced with an entry representing the new mapping information. At step 812, the LRU-g fields 308 and LRU-r fields 310 are updated. More specifically, the LRU-g fields are updated regardless of which client made the request that missed and regardless of whether the replaced entry was a restricted entry. In instances where the replaced entry is one of the restricted entries 302(1) to 302($N_1$), then the LRU-r fields are also updated. If the requesting client is restricted client 202(1), then the LRU-r field of the new entry is advantageously set to indicate that it is the restricted entry most recently used by restricted client 202(1); otherwise, the LRU-r field of the new entry is advantageously set to indicate that it is the restricted entry least recently used by restricted client 202(1). In instances where the replaced entry is one of the unrestricted entries 302($N_1$+1) to 302(N), the LRU-r fields 310 of entries 302(1) to 302($N_1$) are advantageously not updated.

It will be appreciated that the cache control circuit and replacement logic described herein is illustrative and that variations and modifications are possible. Process steps described as sequential may be executed in parallel, order of steps may be varied, and steps may be modified or combined.

Initial population of cache 208 will now be described. At startup, cache 208 is advantageously empty, with the LRU-g and LRU-r fields for each entry set to a special state indicating that the entry is empty. Cache 208 is filled as requests are made and cache misses occur, with empty entries being selected in preference to populated entries where possible.

In accordance with process 800, only the LRU-r field is used when selecting an entry to replace after a cache miss resulting from a request from restricted client 202(1), and consequently the first $N_1$ such misses will result in entries 302(1) to 302($N_1$) becoming populated. Thereafter, each such miss will result in replacement of whichever one of entries 302(1) to 302($N_1$) was least recently used by the restricted client. This behavior is not affected by any possible cache misses and resultant replacement of cache entries by the unrestricted clients because cache activity resulting from the unrestricted clients does not affect the LRU-r data.

For the unrestricted clients, cache 208 is populated as cache misses occur, with only the LRU-g field being used to identify empty entries. In accordance with process 800, the LRU-g field is also updated to reflect use by the restricted client as well as the unrestricted clients, and consequently the entire cache will be filled before cache misses by unrestricted clients begin to result in replacement of entries.

The structure of cache 208 may be varied from that shown in FIG. 3. For instance, although FIG. 3 shows that LRU-r fields are populated for the first $N_1$ entries in cache 208, this is not a required physical configuration; any $N_1$ entries in the cache may have populated LRU-r fields. In some embodiments, every cache entry includes space for an LRU-r field, and the cache is populated sequentially from entry 302(1) to entry 302(N) in response to cache misses, regardless of which clients made the request that missed. The first $N_1$ cache misses resulting from requests by restricted client 202(1) result in LRU-r fields becoming populated for the entries that are populated in response to those misses; once $N_1$ entries have populated LRU-r fields, subsequent cache misses due to restricted client 202(1) result in eviction of one of the entries with a populated LRU-r field, even if the cache is not full. For instance, in one embodiment, the number N of cache entries is 12, of which six are allowed to have populated LRU-r fields. Any six of the cache entries may have populated LRU-r fields, depending on the order in which the first six cache misses from a restricted client occur relative to cache misses from an unrestricted client. Where the $N_1$ LRU-r fields are populated on demand, the number $N_1$ may be a configurable parameter of the TLB system. As noted above, in still other embodiments, the LRU-r field might be absent from the $N_2$ entries for which that field is not to be populated.

While the invention has been described with respect to specific embodiments, one skilled in the art will recognize that numerous modifications are possible. For instance, although the embodiments described herein may make reference to a single restricted client, multiple clients could be identified as restricted. In one such embodiment, there is at most one LRU-r field per entry, as described above, and all restricted clients replace the same subset of restricted entries. In another embodiment, each restricted client is assigned a subset of restricted entries that it can replace. For instance, where two restricted clients are supported, three LRU fields might be defined: LRU-g (used for replacement by unrestricted clients), LRU-r1 (used for replacement by a first restricted client), and LRU-r2 (used for replacement by a second restricted client). Every cache entry would have an LRU-g field; a first subset of the cache entries would also have the LRU-r1 field; and a second subset of the cache entries would also have the LRU-r1 field. The first and second subsets may be overlapping or non-overlapping as desired, and one or more cache entries might be in neither of the first and second subsets. Any number of subsets may be defined in this manner.

In addition, while the embodiments described herein may make reference to LRU fields, it is to be understood that other types of replacement information may be substituted, and the cache is not limited to a strict LRU policy. The replacement information may be physically stored within the cache or in another location accessible to the cache control logic as desired.

It will also be appreciated that, although some embodiments described herein refer to a TLB for a graphics processing subsystem, the technology may also be adapted for use with other computer system component that uses virtual addressing. For example, a TLB cache in accordance with an embodiment of the present invention may be implemented for other peripheral devices (e.g., printers), for virtual memory access by processes executing on a CPU, and so on. Accordingly, where the foregoing description refers to a "client," it is to be understood that the client may be any component or process of a computer system that requests access to a memory resource by reference to a virtual address or that requests a translation of a virtual address.

Further, the cache and cache management techniques described herein are not limited to an address translation cache. Any cache of recently used information that is shared among multiple clients may be implemented and managed in accordance with embodiments of the present invention; for instance, techniques described herein might be applied to a data cache in a graphics processor, CPU, or other processor. Thus, rather than a page table, a cache system can access any backing store that holds all of the data that might be requested; a backing store can be implemented in a memory subsystem, disk-based storage system, or the like.

While the present invention has been described with reference to specific hardware and software components, those skilled in the art will appreciate that different combinations of hardware and/or software components may also be used, and that particular operations described as being implemented in hardware might also be implemented in software or vice versa.

Thus, although the invention has been described with respect to specific embodiments, it will be appreciated that the invention is intended to cover all modifications and equivalents within the scope of the following claims.

What is claimed is:

1. A method of operating a cache having a plurality of cache entries for storing data, the method comprising:
   storing global replacement information in each of the cache entries;
   identifying a subset of the cache entries as restricted cache entries;
   storing restricted replacement information in each of the restricted cache entries,
   receiving requests for data from a plurality of clients including a restricted client;
   in response to each request for data, detecting a cache hit or a cache miss, wherein a cache hit is detected in the event that the requested data is stored in any one of the cache entries and a cache miss is detected in the event that the requested data is not stored in any one of the cache entries;
   in the event that a cache miss is detected in response to a request from the restricted client, selecting one of the restricted cache entries to be replaced with new data, wherein the selection is based on the restricted replacement information; and
   in the event that a cache miss is detected in response to a request from a client other than the restricted client, selecting any one of the cache entries to be replaced with new data, wherein the selection is based on the global replacement information.

2. The method of claim 1 wherein in the event that a cache miss is detected in response to a request from a client other than the restricted client, a cache entry least recently used in response to a request from any one of the plurality of clients is selected to be replaced.

3. The method of claim 1 wherein in the event that a cache miss is detected in response to a request from the restricted client, a restricted cache entry least recently used in response to a request from the restricted client is selected to be replaced.

4. The method of claim 1 wherein the global replacement information includes global recency information indicating which one of the cache entries was least recently used in response to a request from any one of the clients.

5. The method of claim 4 wherein the restricted replacement information includes restricted recency information indicating which one of the restricted cache entries was least recently used in response to a request from the restricted client.

6. The method of claim 1 further comprising, in the event that a cache hit is detected:
updating the global replacement information; and
in the event that the requesting client is the restricted client, also updating the restricted replacement information.

7. The method of claim 1 further comprising:
in the event that a cache miss is detected, retrieving new data for the cache from a backing store; and
replacing the selected cache entry with a representation of the new data.

8. The method of claim 1 wherein the data stored in each cache entry includes mapping information for translating a virtual address to a physical address.

9. The method of claim 1 wherein the cache is in a graphics processor and at least one of the clients is a process that performs rendering operations.

10. A cache system for a processor, the cache system comprising:
an input path configured to receive requests for data originating from a plurality of clients including a restricted client;
a cache configured to store data in each of a plurality of cache entries, wherein a subset of the cache entries are restricted cache entries, wherein the cache comprises global replacement information in each of the cache entries and restricted replacement information in each of the restricted cache entries;
a cache lookup circuit coupled to the input path and the cache and configured to detect a cache hit or a cache miss in response to each request for data, wherein a cache hit is detected in the event that the requested data is stored in any one of the cache entries and a cache miss is detected in the event that the requested data is not stored in any one of the cache entries; and
a cache control circuit coupled to the cache lookup circuit, the cache control circuit being configured to select one of the restricted cache entries to be replaced with new data in the event that a cache miss is detected in response to a request originating from the restricted client and to select any one of the cache entries to be replaced with new data in the event that a cache miss is detected in response to a request originating from a client other than the restricted client, wherein in the event that a cache miss is detected in response to a request from the restricted client, selecting one of the restricted cache entries to be replaced with new data based on the restricted replacement information; and wherein in the event that a cache miss is detected in response to a request from a client other than the restricted client, selecting any one of the cache entries to be replaced with new data based on the global replacement information.

11. The cache system of claim 10 further comprising:
a backing store access circuit coupled to the cache lookup circuit and configured to retrieve the new data from a backing store in the event of a cache miss.

12. The cache system of claim 10 wherein the data stored in each cache entry includes mapping information for translating a virtual address to a physical address.

13. The cache system of claim 10 wherein the processor is a graphics processor and wherein at least one of the clients is a graphics processing core configured to perform rendering operations.

14. The cache system of claim 10 wherein the cache is further configured to store global recency information for each cache entry and to store restricted recency information for each restricted cache entry,
wherein the global recency information indicates which one of the cache entries was least recently used in response to a request from any one of the clients and the restricted recency information indicates which one of the restricted cache entries was least recently used in response to a request from the restricted client.

15. The cache system of claim 14 wherein the cache control circuit is further configured to update the global recency information in the event that a cache hit is detected in response to a request originating from any one of the clients and to also update the restricted recency information in the event that the request originated from the restricted client.

16. A translation lookaside buffer system comprising:
an input arbitration unit configured to receive memory access requests, each memory access request including a virtual address, from a plurality of clients including a restricted client and to select a request to process; and
an address translation unit configured to translate the virtual address for the selected request to a physical address, the address translation unit including:
a cache including a plurality of cache entries, each cache entry configured to store address mapping information usable to translate a virtual address to a physical address, wherein a subset of the cache entries are restricted cache entries;
a cache lookup circuit coupled to receive the virtual address for the selected request and configured to access the cache using the virtual address to detect a cache hit or a cache miss, wherein a cache hit is detected in the event that mapping information for the virtual address is stored in any one of the cache entries and a cache miss is detected in the event that the mapping information for the virtual address is not stored in any one of the cache entries;
a cache control circuit coupled to the cache lookup circuit, the cache control circuit being configured to select one of the restricted cache entries to be replaced with new mapping information in the event that a cache miss is detected in response to a request originating from the restricted client and to select any one of the cache entries to be replaced with new mapping information in the event that a cache miss is detected in response to a request originating from a client other than the restricted client; and
a page table access circuit configured to receive the virtual address in the event of a cache miss and to access a page table to retrieve the mapping information for the virtual address.

17. The translation lookaside buffer system of claim 16 further comprising:
a memory agent configured to receive the memory request and the physical address from the address translation unit and to transmit the memory request to a memory device, wherein the memory device is accessible using the physical address.

* * * * *